United States Patent [19]

Tokugawa

[11] Patent Number: 5,048,865
[45] Date of Patent: Sep. 17, 1991

[54] BUCKLE STALK FOR SEAT BELT SYSTEM
[75] Inventor: Osamu Tokugawa, Fujisawa, Japan
[73] Assignee: Nippon Seiko Kabushiki Kaisha, Tokyo, Japan
[21] Appl. No.: 561,686
[22] Filed: Aug. 2, 1990
[30] Foreign Application Priority Data Aug. 3, 1989 [JP] Japan ............................... 1-91609[U]

[51] Int. Cl.⁵ .............................................. B60R 22/18
[52] U.S. Cl. .................................... 280/801; 297/468; 297/481; 24/173
[58] Field of Search ............... 180/271; 280/801, 808; 297/468, 481, 482; 24/636, 643, 173

[56] References Cited

U.S. PATENT DOCUMENTS

| 4,119,344 | 10/1978 | Kondo | 297/385 |
|---|---|---|---|
| 4,157,841 | 6/1979 | Bergman et al. | 280/801 |
| 4,569,535 | 2/1986 | Haglund et al. | 280/801 |
| 4,575,118 | 3/1986 | Matsui et al. | 280/801 |
| 4,611,854 | 9/1986 | Pfeiffer | 280/801 |
| 4,638,534 | 1/1987 | Sasaki et al. | 280/801 |
| 4,645,231 | 2/1987 | Takada | 280/801 |
| 4,966,393 | 10/1990 | Tokugawa | 280/801 |

FOREIGN PATENT DOCUMENTS

| 3316608 | 11/1984 | Fed. Rep. of Germany | 280/801 |
|---|---|---|---|
| 57-20208 | 4/1982 | Japan . | |
| 59-154277 | 10/1984 | Japan . | |
| 2137479A | 10/1984 | United Kingdom . | |

Primary Examiner—Richard A. Bertsch
Assistant Examiner—Tamara L. Finlay
Attorney, Agent, or Firm—Wegner, Cantor, Mueller & Cantor

[57] ABSTRACT

A buckle stalk suitable for use in a vehicle seat belt system is described. The stalk includes an anchor member to be fixed on a side of a vehicle body, a buckle permitting releasable securement of a webbing thereon, and a non-metallic stalk member connecting the buckle and the anchor member to each other. The buckle stalk member includes a connector, by which the buckle and the stalk member are connected to each other in such a way that the direction of opening of a tongue-receiving socket of the buckle extends at an angle with respect to the stalk member.

5 Claims, 2 Drawing Sheets

BUCKLE STALK FOR SEAT BELT SYSTEM

BACKGROUND OF THE INVENTION

1) Field of the Invention

The present invention relates to a seat belt system for the restraint of an occupant in an automotive vehicle or the like, and specifically to a buckle stalk for such a seat belt system.

2) Description of the Related Art

A vehicle seat belt system includes a buckle stalk for holding an occupant-restraining webbing over a lap portion of an occupant. The buckle stalk is constructed of an anchor member to be fixed to a floor on a side of a vehicle body, a buckle member permitting releasable securement of a webbing thereon, and a stalk member connecting the anchor member and the buckle member to each other.

The buckle stalk is required to maintain the buckle member at a suitable height and also to have tensile strength sufficient to withstand pulling force which may be applied thereto via the webbing in the event of a vehicular accident such as a collision. In addition, it is also required to exhibit a certain degree of flexibility so that it can follow movements of the occupant during its use.

There have conventionally been developed seat belt systems in which a buckle stalk and its associated parts are each made of a metal, typified by those of the so-called wire type in which a wire is used to enhance the strength of a buckle stalk, a fixture for securing the wire to the floor of the vehicle body is fixed to a basal end of the wire, and a connector for connecting the wire to a buckle is fixed to a free end of the wire. These metallic buckle stalks are however accompanied by drawbacks such that because of the high rigidity of their fixtures and buckles, tongues attached to the proximal ends of corresponding webbings cannot be inserted easily or smoothly into buckles and their users do not feel comfortable.

As a solution to the above drawbacks, reference may be made, for example, to Japanese Utility Model Publication No. 20208/1982 published Apr. 30, 1982. A connector is bent or a lower extension of a buckle is bent, whereby the buckle is tilted toward an occupant in an associated seat. In similar ways, various improvements have been made to permit smoother fastening and release of a webbing or to exhibit a certain degree of flexibility to follow movements of an occupant during the use. For similar objects, Japanese Utility Model Application Laid-Open No. 154277/1984 laid open to the public on Oct. 16, 1984 discloses a method to cover a wire with a metal pipe and then bend the pipe.

The above techniques are however applicable only where a stalk member is made of a metal. A nonmetallic buckle stalk has the advantage that it has sufficient flexibility to follow movements of an occupant. However, the non-metallic buckle stalk does not permit inclined arrangement of a buckle relative to a stalk member. Where a stalk member is formed of a fibrous fabric (e.g., a fibrous woven band), the stalk member and the buckle are connected straight by conventional techniques.

If the stalk member and the buckle are connected in a straight manner as described above, a tongue-receiving socket of the buckle opens in the direction of an extension of the buckle stalk when the buckle stalk is mounted on a vehicle body. This has led to the problem that smooth and quick insertion and release of the associated tongue are hampered.

SUMMARY OF THE INVENTION

An object of the present invention is therefore to arrange a buckle at a certain angle with respect to a stalk member even when the stalk member is made of a non-metallic fibrous material (e.g., a fibrous woven band), so that a tongue-receiving socket of the buckle is tilted toward an occupant to improve the ease of fastening and release of a webbing.

In one aspect of the present invention, there is thus provided a buckle stalk suitable for use in a vehicle seat belt system. The stalk has an anchor member to be fixed on a side of a vehicle body, a buckle permitting releasable securement of a webbing thereon, and a non-metallic stalk member connecting the buckle and the anchor member to each other. The buckle stalk further comprises a means for connecting the buckle and the stalk member in such a way that the direction of opening of a tongue-receiving socket of the buckle extends at an angle with respect to the stalk member.

Owing to the above construction, the buckle is connected to the stalk member at a certain inclination relative to the stalk member. As a result, the tongue-receiving socket of the buckle is located at a certain inclination relative to the stalk member. Since the buckle can be fixed with the tongue-receiving socket thereof inclined toward an occupant even when the stalk member is made of a non-metallic fibrous material (e.g., a fibrous woven band), the operation of fastening and release of the webbing (the insertion and release of an associated tongue) can be facilitated. Further, the present invention permits the use of a flexible stalk member so that the stalk member can follow movements of the occupant to give improved comfort to the occupant during the use thereof.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
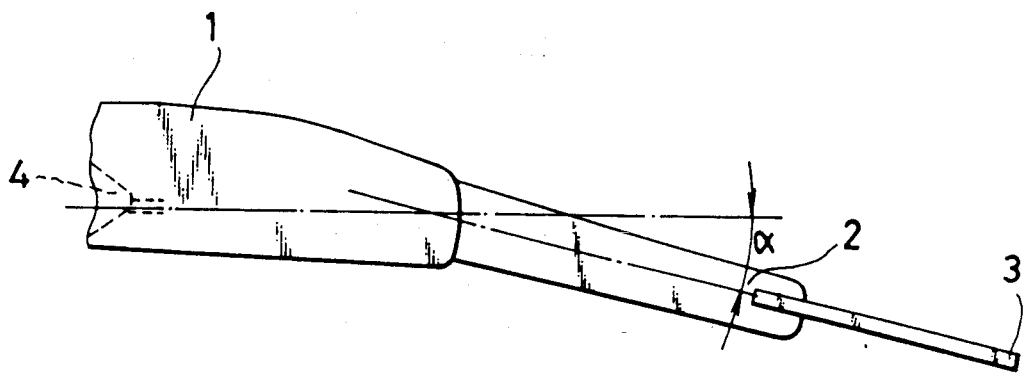
FIG. 1 is an assembled side view of a buckle stalk according to one embodiment of the present invention.
Figure 2:
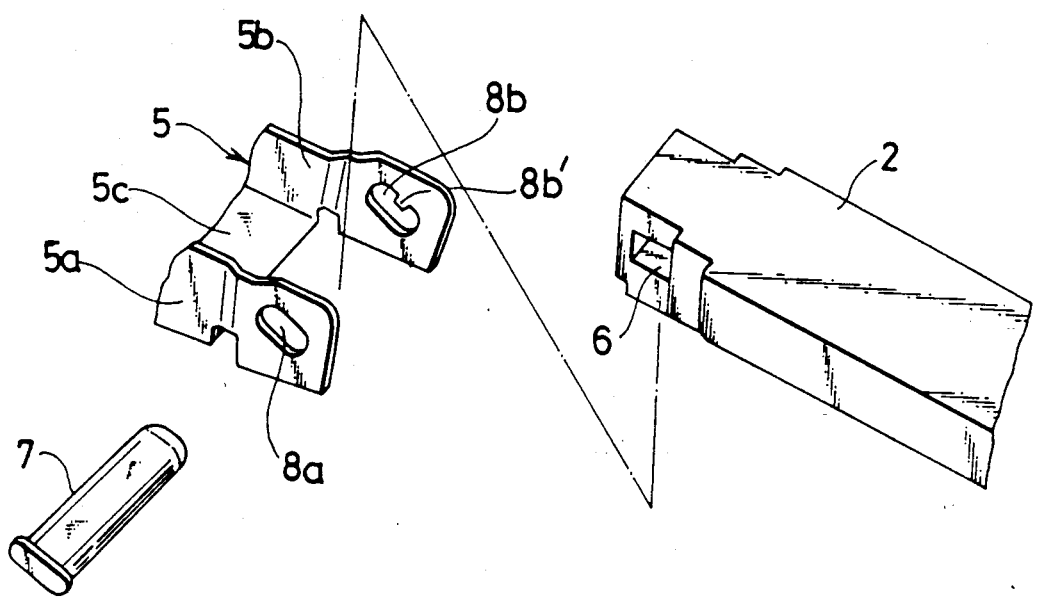
FIG. 2 is an exploded fragmentary perspective view of a buckle and a stalk member in the buckle stalk.
Figure 3:
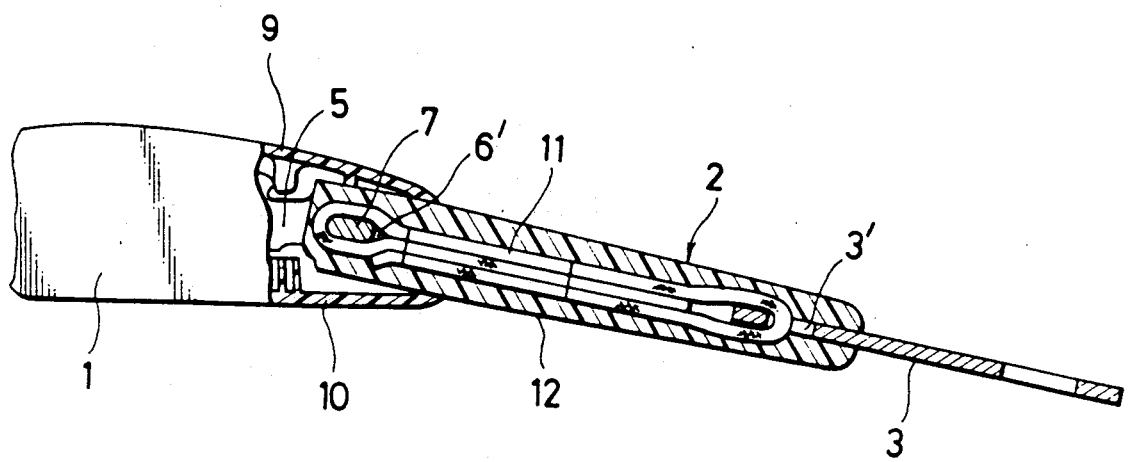
FIG. 3 is a partly cross-sectional side view of the buckle stalk.

Referring to FIGS. 1 through 3, a buckle stalk according to one embodiment of the present invention will be described in detail.

As is illustrated in FIG. 1, the buckle stalk is constructed of a buckle 1, a stalk member 2 and an anchor member 3. The buckle 1 defines a tongue-receiving socket 4, in which an unillustrated tongue connected to an occupant-restraining webbing (not shown) is inserted to releasably support the webbing. The anchor member 3 is fixed to a floor or the like of a vehicle body so that pulling force applied to the webbing can be transmitted to the vehicle body. The stalk member 2 connects the buckle 1 and the anchor member 3 to each other, and maintains the buckle 1 at a suitable height from the floor of the vehicle to facilitate fastening and release of the webbing. To direct the tongue-receiving socket 4 toward an occupant in an associated seat, the buckle 1 and the stalk member 2 are connected at an angle α.

The stalk member 2 centrally has a fibrous woven band 11 as a strength member as shown in FIG. 3. An end portion of the band 11 extends through a through-hole 3' formed in the anchor member 3 and is folded back, while an opposite end portion of the band 11 is folded back to form a loop 6' which is used to connect the stalk member 2 to the buckle 1 as will be described in more detail subsequently. The former and latter end portions are overlapped and are sewn together. The band 11 with the loops formed at both ends thereof is completely embedded in a resin-made sheath 12. As is depicted in FIG. 2, the sheath 12 defines a through-hole 6 in registration with the loop 6' of the band 11.

Reference is now made to FIG. 2. The buckle 1 and the stalk member 2 are connected by a connecting pin 7. A buckle base 5 which is a strength member of the buckle 1 has a floor 5c and side walls 5a,5b extending upright from opposite sides of the floor 5c, respectively. Connecting holes 8a,8b are formed through the side walls 5a,5b, respectively. The connecting holes 8a,8b are brought into registration with the through-hole 6 of the resin-made sheath 12 of the stalk member 2. The connecting pin 7 is then inserted through the hole 8a, the through-hole 6 and the hole 8b, whereby the buckle 1 and stalk member 2 are connected to each other. The side wall 5b has a tab 8b' as a projection, which extends into the connecting hole 8b. The tab 8b' is crimped when the connecting pin 7 is inserted in the connecting hole 8b from the side of the connecting hole 8a, so that the connecting pin 7 is firmly fixed on the buckle base 5.

The connecting holes 8a,8b of both the side walls 5a,5b of the buckle base 5 are substantially rectangular. The connecting holes 8a,8b are formed with longer edges thereof extending at an angle close to the angle o shown in FIG. 1, so that neither longer edges nor shorter edges of the rectangular holes 8a,8b extend parallel to the tongue-inserting direction. The through-hole 6 of the resin-made sheath 12 of the stalk member 2 also has a rectangular cross-section like the connecting holes 8a,8b. However, the longer edges of the rectangular cross-section of the through-hole 6 extend in parallel with the length of the stalk member 2. The connecting pin 7 also has a substantially rectangular cross-sectional shape like the connecting holes 8a,8b and the through-hole 6. However, the connecting pin 7 is fully rounded at the shorter sides thereof. The fibrous woven band 11 is therefore protected from damages which would otherwise occur by pulling forces applied thereto from the buckle 1 via the connecting pin 7. By bringing the connecting holes 8a,8b into registration with the through-hole 6 and connecting the buckle 1 and the stalk member 2 together with the connecting pin 7, the buckle 1 extends as a whole at the angle α with respect to the stalk member 2 as illustrated in FIG. 1. As a result, the tongue-receiving socket 4 is inclined toward the occupant in the associated seat.

The fibrous woven band 11 and the resin-made sheath 12 are used as a non-metallic stalk member in the embodiment described above. It is to be noted that the fibrous woven band 11 can be replaced by twisted cords of a non-metallic material or the like.

What is claimed is:

1. In a buckle stalk suitable for use in a vehicle seat belt system, said stalk having an anchor member to be fixed on a side of a vehicle body, a buckle remitting releasable securement of a webbing thereon, and a non-metallic stalk member connecting said buckle and said anchor member to each other, the improvement wherein said buckle stalk further comprises a means for connecting said buckle and said stalk member in such a way that the direction of opening of a tongue-receiving socket of said buckle extends at an angle with respect to said stalk member;

wherein said buckle has a buckle base equipped with a combination of opposing side walls; and said connecting means defines connecting holes through said side walls, respectively, and has a connecting pin extending through a loop of said non-metallic stalk member, said loop being arranged between said side walls, and engaging said connecting holes; and wherein one of said side walls has a projection extending inwardly into the corresponding connecting hole and crimped by said connecting pin upon insertion of said connecting pin whereby said connecting pin is firmly secured on said buckle base.

2. In a buckle stalk suitable for use in a vehicle seat belt system, said stalk having an anchor member to be fixed on a side of a vehicle body, a buckle remitting releasable securement of a webbing thereon, and a non-metallic stalk member connecting said buckle and said anchor member to each other, the improvement wherein said buckle stalk further comprises a means for connecting said buckle and said stalk member in such a way that the direction of opening of a tongue-receiving socket of said buckle extends at an angle with respect to said stalk member;

wherein said buckle has a buckle base equipped with a combination of opposing side walls; and said connecting means defines connecting holes through said side walls, respectively, and has a connecting pin extending through a loop of said non-metallic stalk member, said loop being arranged between said side walls, and engaging said connecting holes; and wherein said connecting holes have a substantially rectangular shape so that each edge of said connecting holes extends at an angle with respect to said tongue-receiving direction.

3. The buckle stalk of claim 2, wherein said connecting pin has a substantially rectangular cross-sectional shape conforming with said connecting holes.

4. The buckle stalk of claim 3, wherein both shorter sides of said connecting pin define fully-rounded surfaces.

5. The buckle stalk of claim 3, wherein said stalk member defines, on a side of said buckle, a through-hole in registration with said loop of said non-metallic stalk member so that said connecting pin extends through said through-hole; and said through-hole of the stalk member has a rectangular cross-section with longer edges thereof extending in parallel with the length of said stalk member.

* * * * *

UNITED STATES PATENT AND TRADEMARK OFFICE
CERTIFICATE OF CORRECTION

PATENT NO. : 5,048,865
DATED : September 17, 1991
INVENTOR(S) : Osamu TOKUGAWA

It is certified that error appears in the above-identified patent and that said Letters Patent is hereby corrected as shown below:

Claim 1, at column 4, line 6, change "remitting" to --permitting--.

Claim 2, at column 4, line 30, change "remitting" to --permitting--.

Signed and Sealed this

Thirtieth Day of November, 1993

Attest:

BRUCE LEHMAN

Attesting Officer

Commissioner of Patents and Trademarks